United States Patent [19]
Baecker et al.

[11] Patent Number: 5,725,921
[45] Date of Patent: Mar. 10, 1998

[54] LINER FOR PROTECTING POLES AGAINST SUB-SOIL DECAY

[75] Inventors: Alexander Wladyslaw Baecker, Westville; Graham David Shelver, Vorna Valley, both of South Africa

[73] Assignee: Biotrans International (Pty) Ltd., Sandton, South Africa

[21] Appl. No.: 664,830

[22] Filed: Jun. 17, 1996

[30] Foreign Application Priority Data

Jun. 20, 1995 [ZA] South Africa ............... 95/5099
Aug. 29, 1995 [ZA] South Africa ............... 95/7240

[51] Int. Cl.$^6$ ............................................. A01N 25/34
[52] U.S. Cl. ............ 428/34.9; 428/35.2; 428/349; 428/913; 424/412; 156/86; 156/244.11; 174/DIG. 8
[58] Field of Search ............... 428/34.9, 9, 515, 428/516, 913, 347, 349, 35.2; 174/DIG. 8; 424/405, 411, 412, 414; 138/118, 118.1, 119, 141; 156/84–85, 244.11, 243

[56] References Cited

U.S. PATENT DOCUMENTS

| 4,386,071 | 5/1983 | Carle .................... 424/724 |
| 5,134,000 | 7/1992 | Smythe et al. .......... 428/34.9 |
| 5,175,032 | 12/1992 | Steele et al. ........... 428/34.9 |
| 5,302,428 | 4/1994 | Steele et al. ........... 428/34.9 |
| 5,413,790 | 5/1995 | Koppe et al. ........... 428/34.9 |
| 5,449,537 | 9/1995 | Pieper et al. .......... 428/34.9 |

Primary Examiner—Rena Dye
Attorney, Agent, or Firm—Marshall, O'Toole, Gerstein, Murray & Borun

[57] ABSTRACT

The invention relates to a sleeve provided for protecting a timber pole against sub-soil decay. The application of the sleeve on a pole forms part of a primary/preventative form of treatment, the sleeve comprising a composite structure including at least two layers of synthetic plastic material. At least one of the layers of the sleeve has heat shrink properties permitting the sleeve to be heat shrunk onto a pole, all the individual layers of the sleeve being of different materials having different properties that are selected in terms of the specific conditions of a pole to be protected and the sub-soil conditions to which the pole will be exposed, in use.

13 Claims, 1 Drawing Sheet

LINER FOR PROTECTING POLES AGAINST SUB-SOIL DECAY

FIELD OF THE INVENTION

THIS INVENTION relates to a sleeve provided for protecting a timber pole against sub-soil decay.

BACKGROUND OF THE INVENTION AND PRIOR ART

It is known to treat poles already in service and affected by sub-soil decay by applying a wrapping around such poles, the wrapping serving to prevent antimicrobial pastes applied to the poles from separating from the poles. The antimicrobial pastes serve to arrest decay of the poles while in service, this method of treating poles requiring repetition at regular intervals, which renders the method expensive.

The above method of pole treatment constitutes a secondary/remedial form of treatment, the present invention relating specifically to a primary/preventative form of treatment which constitutes a form of pre-treatment which is carried out prior to first use of a pole. This pre-treatment is designed, in part, to do away with the need for secondary/remedial treatment, thus providing a relatively cheap form of treatment which does not require repetition after a pole so treated has been put in service.

In order to pre-treat a timber pole against sub-soil decay prior to insertion of the pole into a body of soil, it is known to externally cover a region of the pole to be disposed within the soil with a synthetic plastic sleeve. Particularly, within a body of soil in which a pole can be supported, an air gradient is defined that decreases from a fully aerated above soil position to a soil depth of approximately 150 cm deep, depending on soil conditions, where near anaerobic conditions exist. Also, a moisture gradient is defined in the soil that decreases from relatively wet soil conditions at large depths to relatively dry surface soil. Within a specific region where the two said gradients overlap/intersect, optimal conditions of moisture and air availability exist, which permit fungal decay of poles to progress to the stage where poles can fail completely. More specifically, fungi colonize the wood/soil interface and particularly in the said region of optimal conditions, hereinafter referred to as the optimal fungal growth region, fungi gradually penetrate and colonize the timber, degrading it as colonization progresses. This sub-soil decay is particularly prevalent in respect of poles that are used in extremely wet soil conditions such as, for example, in respect of poles used in areas that are exposed to floods, flood irrigation, and the like.

By applying a synthetic plastic sleeve on a pole to cover particularly the optimal fungal growth region, this region is effectively isolated from air and moisture, as well as from nitrogenous compounds required for fungal growth to occur. As such, the pole is effectively pre-protected against fungal decay. It is clearly important that sleeves are applied in a configuration in which they effectively isolate poles from air and moisture, as well as from nitrogenous compounds existing in the soil and to ensure this, the sleeves are provided of liquid impermeable, non-biodegradable synthetic plastic materials, the materials of known sleeves being of types that permit application of the sleeves onto poles by heat shrinking. Materials that have been proposed for use as sleeves include polyvinyl chloride, which is considered environmentally unacceptable due to emissions on combustion, and low density polyethylene, which is considered environmentally acceptable. For enhancing further the effectiveness of these sleeves, it has been proposed to incorporate a dry film biocide into the material of the sleeves, the biocide ensuring that the sleeves themselves will not biodeteriorate during use, thus rendering protection of poles effective for extended periods of time. The dry film biocide is a biocide that is stable and that remains within the sleeves, thus providing long term protection for the sleeves while also preventing fungal growth on the surface region of poles in contact with the sleeves.

However, one known problem associated with known sleeves of the above materials is that when used on poles that are already creosote treated, as is commonly the case, the relatively non-polar creosote solution penetrates the relatively non-polar amorphous region of the plastic material and particularly when exposed to heat, causes the material to expand permanently, resulting in a loose fit of the sleeves on poles, whereby the sleeves are rendered ineffective insofar as the pole again can become exposed to air and moisture and fungi. Loose fitting sleeves also will permit leaching of creosote from poles, which will further reduce the resistance of the poles to deterioration.

Another problem associated with the use of known sleeves relates to sleeve damage that often occurs during application of sleeves onto poles, during the transportation of poles having sleeves applied thereon and during insertion of poles having sleeves applied thereon into the ground. In certain soil conditions, sleeves also are exposed to attack by termites which can eventually result in sleeves becoming ineffective. Known sleeves provided for the purpose of protecting poles against sub-soil decay accordingly are effective where conditions accommodate these sleeves, but in most practical conditions where sleeves are used on creosote treated poles and/or where these sleeves are exposed to damage due to handling of the poles and/or where sleeves applied on poles are exposed to attack by termites, the sleeves do not provide long term protection. As such, it is an object of this invention to provide a sleeve for the protection of a pole which will be effective for protecting the pole against sub-soil decay where the pole itself or the soil conditions surrounding a pole where the pole is to be positioned, are exposed to conditions in respect of which known sleeves do not provide effective long term protection.

SUMMARY OF THE INVENTION

According to the invention there is provided a synthetic plastic sleeve provided for protecting a timber pole against sub-soil decay, which sleeve comprises a composite structure including at least two layers of synthetic plastic material of which at least one layer has heat shrink properties, the sleeve being dimensioned to fit slidably over a pole to be protected, and by being heated, to shrink tightly onto the pole, the synthetic plastic materials forming the layers of the sleeve having different properties that are selected in terms of the specific conditions of a pole to be protected and the sub-soil conditions to which the pole will be exposed, in use.

The synthetic plastic materials forming the layers of the sleeve preferably are liquid impermeable and non-biodegradable.

Furthermore, the material forming one layer of the sleeve may have a dry film biocide incorporated therein, the said one layer of the sleeve being selected from the group consisting of low density polyethylene, high density polyethylene, cross-linked low density polyethylene and cross-linked high density polyethylene. The said one layer of the sleeve preferably is the operative inner layer of the sleeve so that in the in-use configuration of the sleeve the dry film biocide within the layer of the sleeve will protect the said layer itself against biodeterioration, whereas it will also protect fungal growth on the surface of a timber pole on which the sleeve is applied and also on the interface between the said inner layer of the sleeve and the abutting layer surrounding the said inner layer. The dry film biocide incorporated into the said one layer of the sleeve may comprise a mixture of methyl benzimidazole-2-YL 0 carbamate, 2-octyl-4-isothiazolinone-3-one and 3-(3,4-dichlorophenyl)-1,1-dimethyl urea.

Further according to the invention, the synthetic plastic material forming one layer of the sleeve may be resistant to creosote for providing long term creosote impermeability. As such, the said one layer of the sleeve may be of polypropylene which is totally creosote impermeable. The polypropylene layer also provides the sleeve with an element of resistance to physical damage.

Still further, the synthetic plastic material forming one layer of the sleeve may have a termiticide incorporated therein. The termiticide preferably is of a type that not only poisons termites that ingest it, but also repels termites from the plastic. For example, the termiticide may be the synthetic pyrethroids Deltamethrin, Permethrin and Cypermethrin.

Still further according to the invention, the synthetic plastic material forming the operative outer layer of the sleeve may be of a damage resistant material which can protect the remainder of the sleeve during its application onto a pole, the transport of a pole having the sleeve applied thereon and the location of a pole in a body of soil. As such, a synthetic plastic material forming the operative outer layer of the pole may be selected from the group consisting of cross-linked low density polyethylene and cross-linked high density polyethylene.

Where a layer of the sleeve is of a cross-linked configuration, cross-linking preferably is applied to the plastic granules before extrusion as film, thus providing the film with better heat shrink properties than film cross-linked after its extrusion.

It will be understood that the field liner of the invention may comprise a sleeve made up of any number of layers of material where the different layers will provide the sleeve with different required properties. The layers forming a sleeve may be laminated on one another, typically by heat welding. More particularly, the sleeve may be formed by a coextrusion process whereby material layers are effectively heat welded together, or by any other suitable means or process whereby different layers of a synthetic plastic material can be effectively laminated together.

The length of the sleeve may be determined by the area of a pole to be protected thereby, it being envisaged particularly that a sleeve of an extended length can be provided, which can be cut into shorter lengths suitable to serve as a sleeve for protecting a timber pole against sub-soil decay.

One end of the sleeve may be blocked for facilitating the location of the sleeve on a pole, it being required in practice that this blocked end of the sleeve is punctured after the application of the sleeve on a pole in order to prevent accumulation of water and anaerobic conditions, thereby rendering the sleeve effective to prevent anaerobic decay of the pole which could occur if such drainage is not provided for.

For a sleeve comprising a cross-linked low density polyethylene layer of material, cross-linking of the low density polyethylene may be effected while still in granular form before extrusion by Gamma Radiation or by using specific chemicals such as peroxides. A chemical such as tri-allyl-cyanurate can substantially improve cross-linking when incorporated into low density polyethylene as an additive.

BRIEF DESCRIPTION OF THE DRAWINGS

Further features of the invention, including the benefits of the invention, are described in more detail hereinafter, with reference to an example of the invention, illustrated by way of the accompanying diagrammatic drawings, in which.

DETAILED DESCRIPTION OF THE INVENTION

Figure 1:
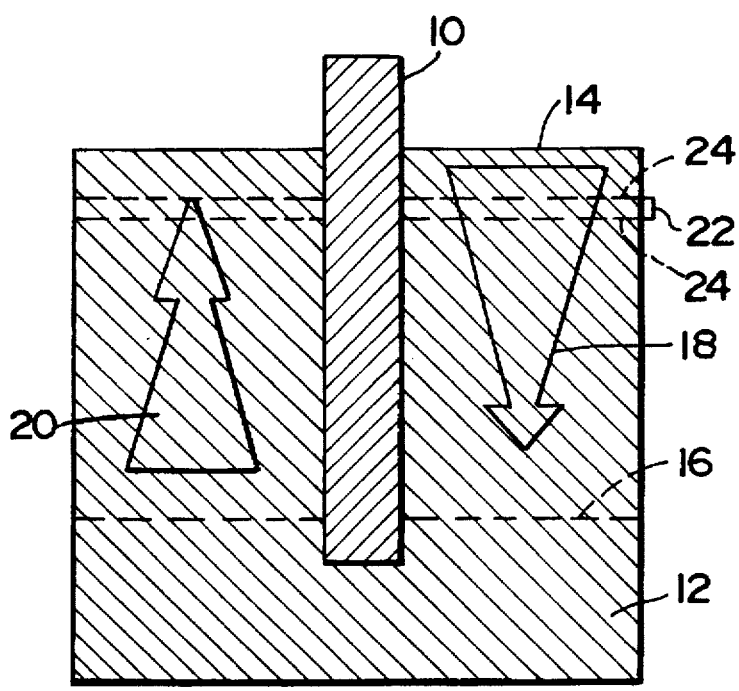
FIG. 1 illustrates schematically the location of a timber pole supported in soil and the soil conditions beneath the top soil level.

Referring initially to FIG. 1 of the drawings, there is shown a timber pole 10 supported in a conventional upright configuration in a body of soil 12. The solid line 14 indicates the top soil level, whereas the dotted line 16 indicates the depth within the soil beneath which near anaerobic conditions exist. This level usually will be approximately 150 cm beneath the top soil level, depending on soil and site conditions. The arrow 18 indicates a decrease in air gradient, the air gradient decreasing from a fully aerated position at the soil level 14, to the line 16 beneath which near anaerobic conditions exist.

The arrow 20 illustrates a moisture gradient within the moisture content in the soil decreasing from relatively wet soil at a substantial depth beneath the soil surface to relatively dry soil near the soil surface 14.

The region 22 between the dotted lines 24 constitute a region where the two said gradients overlap/intersect with one another, defining a region where optimal conditions of moisture and oxygen availability exist to permit fungal decay of the pole to progress to the stage where the pole can fail completely. This region 22 is herein referred to as the optimal fungal growth region. In order to protect the pole 10 against fungal decay, it is known to apply a field liner comprising a sleeve 26, which is liquid impervious and non-biodegradable, on the pole, the said sleeve covering the pole 10 particularly in the region 22, and also over a length of the pole, both above and beneath the said region 22. Optimally, the sleeve will extend to a location approximately 150 mm above the soil level, but in conditions where the pole is located in flooded conditions, the sleeve 26 will extend to a location approximately 150 mm above the water level in the region where the pole is located.

Figure 2:
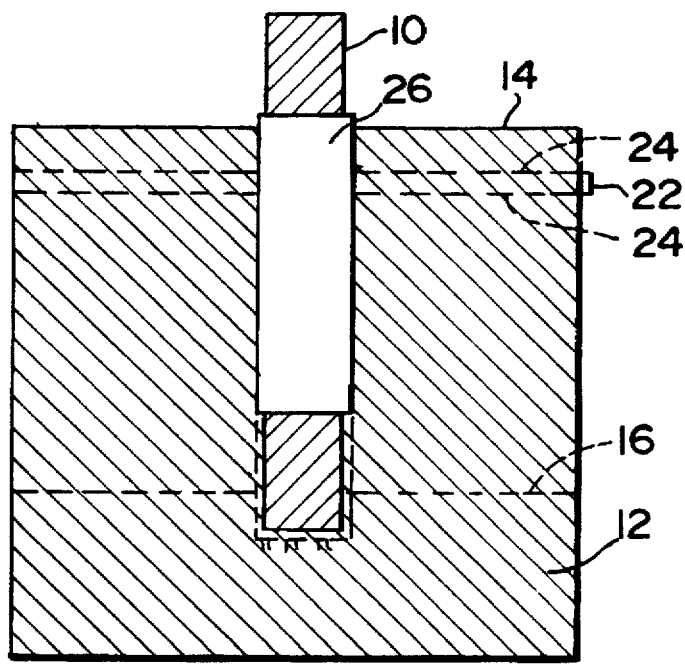
FIG. 2 illustrates schematically the location of the pole as shown in FIG. 1, having been protected by a sleeve, in accordance with the invention.

As is clear from FIGS. 1 and 2, the sleeve 26 extends downwardly to a region near the line 16 where near anaerobic conditions exist and where subsoil decay of the pole is unlikely to occur, it also being anticipated that for the sake of convenience, the sleeve 26 can extend right to the bottom end of the pole, without completely covering the said bottom end. Particularly, one end of the sleeve 26 can be blocked to facilitate the location of the sleeve on the pole upon application, the blocked end then being punctured in order to render the sleeve effective in all respects. This is illustrated in dotted lines in FIG. 2.

Figure 3:
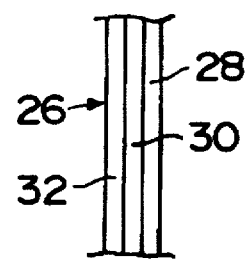
FIG. 3 illustrates an enlarged cross section through the sleeve of FIG. 2, illustrating the composite structure thereof.

Referring particularly to FIG. 3 of the drawings in which is illustrated, by way of example, the cross-sectional configuration of one particular embodiment sleeve, in accordance with the invention, the sleeve 26 is made up of three layers of material including an inner layer 28, an intermediate layer 30 and an outer layer 32.

The inner layer 28 typically is a low density polyethylene layer having a dry film biocide incorporated therein, this layer, in use of the sleeve 26, being in contact with the outer face of a timber pole protected by the sleeve, the dry film biocide incorporated therein ensuring the long term integrity of this layer, while at the same time preventing fungal growth on the outer face of the associated pole, particularly the growth of fungi resistant to creosote with which the pole has been pre-treated prior to the application of the sleeve. A typical dry film biocide comprises a mixture of methyl benzimidazole-2-YL-0 carbamate, 2-octyl-4-isothiazolinone-3-one and 3-(3,4-dichlorophenyl)-1,1-dimethyl urea.

The intermediate layer 30 typically is a polypropylene layer which is totally creosote impermeable, even at relatively high temperatures, thus ensuring that the sleeve will not permit creosote leaching from the pole over extended periods of time.

The outer layer 32 is a cross-linked low density polyethylene or high density polyethylene layer which has particular strength qualities which will render it resistant to physical damage, both during the application of sleeves onto poles, the transportation of poles having sleeves applied thereon and during the insertion of poles having sleeves applied thereon into soil.

The sleeve 26 accordingly provides an effective protective sleeve for use on creosote treated poles, insofar as the inner layer will prevent fungi growth on the outer face of the poles, the intermediate layer will prevent leaching of creosote, whereas the outer layer provides the field liner with the required physical damage resistance properties. Still further, this combination of material layers will have sufficient heat shrink properties to permit effective heat shrinking of a sleeve onto a pole, the dimensions of a sleeve clearly being such that it can be effectively heat shrunk onto a pole in order to cover a required region of a pole.

It must be understood that for different applications of poles where different protection requirements exist, the sleeve forming a field liner may be provided with different qualities through the selection of different material layers, the number and thickness of layers clearly being determined by the requirements of the field liner in order to provide required protection for a pole. It is envisaged that a wide range of materials could be considered for forming part of a field liner in order to accommodate various different requirements. For example, one layer of a sleeve may incorporate a pyrethroid termiticide, which layer may be a separate layer or a layer fulfilling another purpose also.

Individual material layers for forming a sleeve may be produced in any conventional manner, including where cross linking is required, whereas the formation of a multi-layer sleeve typically may be effected by a co-extrusion process which will effectively provide for the separate layers to be heat welded together during the extrusion forming process of the individual layers.

Sleeve dimensions clearly are greatly variable and are determined by the dimensions of poles to be protected thereby. It is envisaged also that a sleeve may be formed by co-extruding an extended length which can then be subdivided into shorter lengths for forming individual sleeves. The invention clearly extends to the various configuration sleeves envisaged, which essentially fall within the scope of the present invention.

We claim:

1. A synthetic plastic sleeve provided for protecting a timber pole against subsoil decay, which sleeve comprises a composite structure including at least two sheet material layers of synthetic plastic material of which at least one layer has heat shrink properties and of which the operative outer layer is of a damage resistant material which can protect the remainder of the sleeve during its application onto a pole, the transport of a pole having the sleeve applied thereon and the location of the pole in a body of soil, the sleeve being dimensioned to fit slidably over a pole to be protected, and by being heated, to shrink tightly onto the pole, the synthetic plastic materials forming the sheet material layers of the sleeve having different properties that are selected in terms of the specific conditions of a pole to be protected and the subsoil conditions to which the pole will be exposed, in use, with the synthetic plastic material forming one of the sheet material layers having a dry film biocide comprising a mixture of methyl benzimidazole-2-YLO carbamate, 2 octyl-4-isothiazolinone-3-one and 3-(3,4-dichlorophenyl)-1, 1-dimethyl urea incorporated therein.

2. A sleeve as claimed in claim 1, in which the synthetic plastic materials forming the layers of the sleeve are liquid impermeable and non-biodegradable.

3. A sleeve as claimed in claim 1, in which the synthetic plastic material forming the said one layer of the sleeve is selected from the group consisting of low density polyethylene, high density polyethylene, cross-linked low density polyethylene and cross-linked high density polyethylene.

4. A sleeve as claimed in claim 1, in which the said one layer of the sleeve is the operative inner layer of the sleeve.

5. A sleeve as claimed in claim 1, in which the synthetic plastic material forming one layer of the sleeve is resistant to creosote for providing long term creosote impermeability.

6. A sleeve as claimed in claim 5, in which the said one layer of the sleeve is of polypropylene.

7. A sleeve as claimed in claim 1, in which the synthetic plastic material forming one layer of the sleeve has a pyrethroid termiticide incorporated therein.

8. A sleeve as claimed in claim 1, in which the said operative outer layer of the pole of a material is selected from the group consisting of cross-linked low density polyethylene and cross-linked high density polyethylene.

9. A sleeve as claimed in claim 8, in which the cross-linked material is made from cross-linked granules of the material.

10. A sleeve as claimed in claim 1, in which the layers of the sleeve are laminated on one another.

11. A sleeve as claimed in claim 1, in which the layers of the sleeve are heat welded together.

12. A sleeve as claimed in claim 1, in which the layers of the sleeve are formed by a co-extrusion process providing for the layers to be heat welded together.

13. A sleeve as claimed in claim 1, in which the length of the sleeve is determined by the area of a pole to be protected thereby.

* * * * *

UNITED STATES PATENT AND TRADEMARK OFFICE
CERTIFICATE OF CORRECTION

PATENT NO.   : 5,725,921
DATED        : March 10, 1998
INVENTOR(S)  : Baecker et al.

It is certified that error appears in the above-identified patent and that said Letters Patent is hereby corrected as shown below:

Column 6,
Line 23, replace "YLO" with -- Y O --.

Signed and Sealed this

Fourth Day of June, 2002

Attest:

Attesting Officer

JAMES E. ROGAN
Director of the United States Patent and Trademark Office